Figure 1:
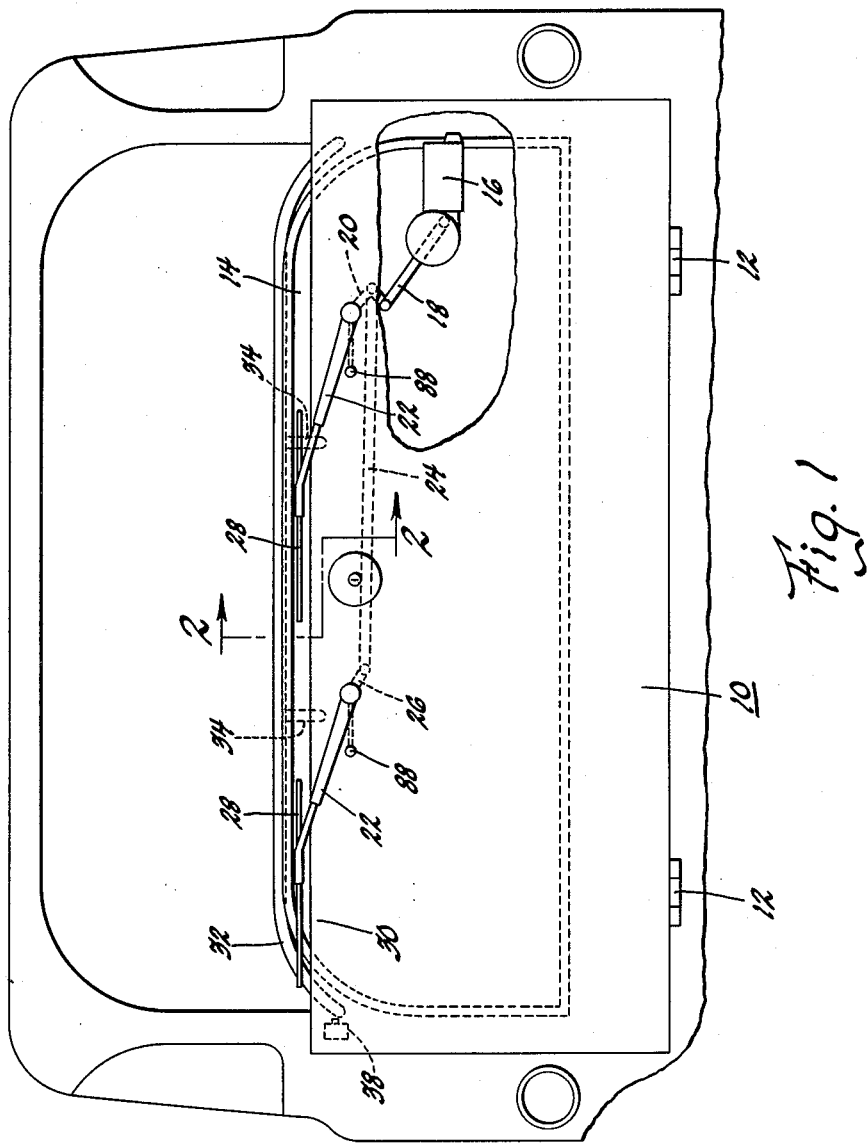

INVENTORS
Arthur J. Carpenter
Harry O. Mackie
BY
W. E. Finken
THEIR ATTORNEY

INVENTORS
Arthur J. Carpenter
Harry O. Mackie
BY
THEIR ATTORNEY

United States Patent Office 3,107,383
Patented Oct. 22, 1963

3,107,383
VEHICLE WINDOW CLEANING SYSTEM
Arthur J. Carpenter, Royal Oak, and Harry A. Mackie, Birmingham, Mich., assignors to General Motors Corporation, Detroit, Mich., a corporation of Delaware
Filed Dec. 18, 1961, Ser. No. 160,081
20 Claims. (Cl. 15—250.02)

This invention pertains to window cleaning systems for vehicles, and particularly to a system for cleaning both the windshield and the tailgate window of stationwagon-type vehicles.

The desirability of providing cleaning means for the tailgate, or rear, window of station wagon vehicles has long been recognized, since due to the construction of station wagon-type vehicles the rear windows are substantially vertical and great quantities of vision obscuring material are deposited thereon when driving in inclement weather. Obviously, adequate rear vision is necessary when driving in inclement weather, and thus the present invention constitutes a safety feature which will enable the drivers of station wagon-type vehicles to have adequate forward and rearward vision at all times. The majority of station wagons now being built have rear windows which move vertically into and out of a channel on the tailgate, and accordingly means must be provided for precluding operation of the rear window wipers when the rear window is lowered, and also means must be provided for preventing operation of the rear window washer when the rear window is lowered.

Accordingly, among our objects are the provision of a rear window cleaning system for vehicles including a washer unit and a wiper unit which can be operated conjointly; the further provision of a window cleaning system for the front and rear windows of a vehicle including wiper unit means and washer unit means which can be operated conjointly; the further provision of a wiper unit for use with a vertically movable window; and the still further provision of a control system for the wiper unit and the washer unit of a rear vehicle window including means for automatically parking the rear window wiper unit when the rear window is lowered.

The aforementioned and other objects are accomplished in the present invention by constructing the tailgate assembly of a vehicle such that the wiper blades therefor are always maintained in contact with the window irrespective of whether the window is raised or lowered. To accomplish this result, a transversely extending guard rail is attached to the tailgate in the interior of the vehicle, and the tailgate window assembly is movable only to a position slightly below the guard rail rather than completely within the tailgate. In this manner the wiper blades, which in their parked positions lie in substantially horizontal positions adjacent the upper reveal molding of the tailgate, will always remain substantially in contact with the glass whether the rear window be raised or lowered.

Preferably, although not necessarily, the rear window wiper unit includes an electric motor connected by suitable linkage means to a pair of wiper arms and blades which are oscillated in tandem, or in phase, across the outer surface of the rear window between predetermined inboard and outboard stroke end limits. The inboard stroke end limit constitutes the park position of the wiper blades which, as alluded to hereinbefore, places the blades in a substantially horizontal position proximate the upper reveal molding of the tailgate. However, it is to be understood that other types of wiper motors may be used to power the wiper unit as contemplated by the scope of the present invention, for example pneumatic or hydraulic motors of any well known type.

The rear window cleaning system may also embody a washer unit which may be of the type having an interruptible driving connection with the wiper motor as shown in Ziegler Patent 2,878,505.

In order to prevent operation of the rear window cleaning system when the rear window is lowered a micro switch, actuated by the window, is provided which open circuits the wiper unit motor to prevent operation of the rear window cleaning system under these conditions.

The present invention also contemplates the use of an electric motor driven actuator for raising and lowering the rear window of the station wagon vehicle. Since the wiper and washer units can only be energized when the vehicle ignition switch is closed, whereas the tailgate window actuator can be operated with the ignition switch open, the control system embodies a relay which automatically energizes the wiper unit motor and moves the blades to their parked positions if the tailgate window should be lowered with the wiper blades in some other position. This feature will prevent damage to the wiper blades and arms since they would otherwise be disengaged from the rear window as it is lowered into the tailgate.

In another aspect, the present invention contemplates coordinated operation of the windshield cleaning system with the rear window cleaning system. In one embodiment, the washer unit is common to both the rear window and the windshield, while both the windshield and the rear window have separate wiper units. In this embodiment, means are provided for preventing operation of the rear window washer when the wiper blades on the rear window are in their parked positions, this structure being more particularly disclosed and claimed in copending application S. N. 160,067 filed of even date herewith in the name of Leonard A. Lystad, and assigned to the assignee of this invention.

In another embodiment, the present invention contemplates a system wherein the windshield and rear cleaning systems will be actuated simultaneously through the use of a single control switch so as to assure the maintenance of a clear field of vision both forwardly and rearwardly.

Further objects and advantages of the present invention will be apparent from the following description, reference being had to the accompanying drawings, wherein preferred embodiments of the present invention are clearly shown and wherein similar numerals depict similar parts throughout the several views.

Figure 2:
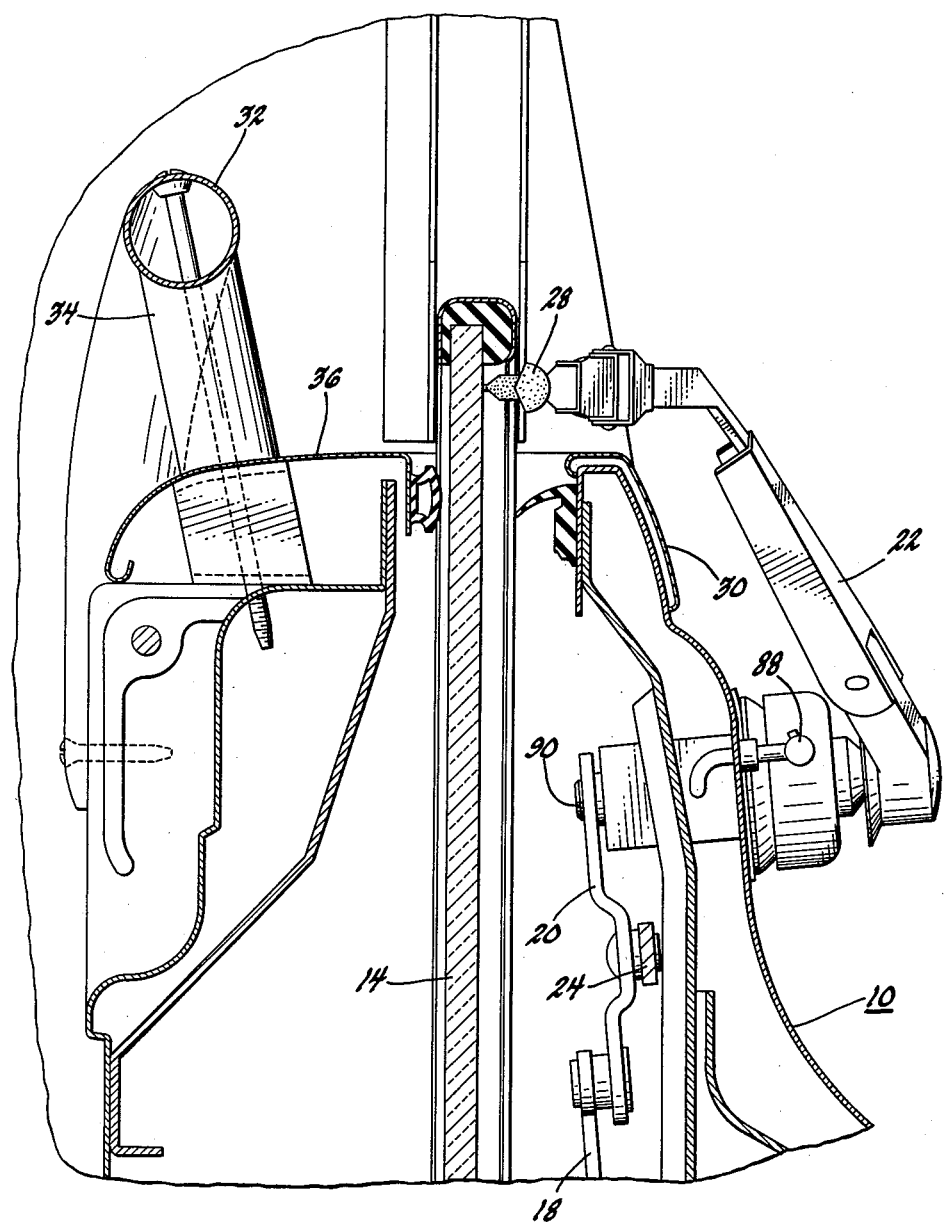
Figure 3:
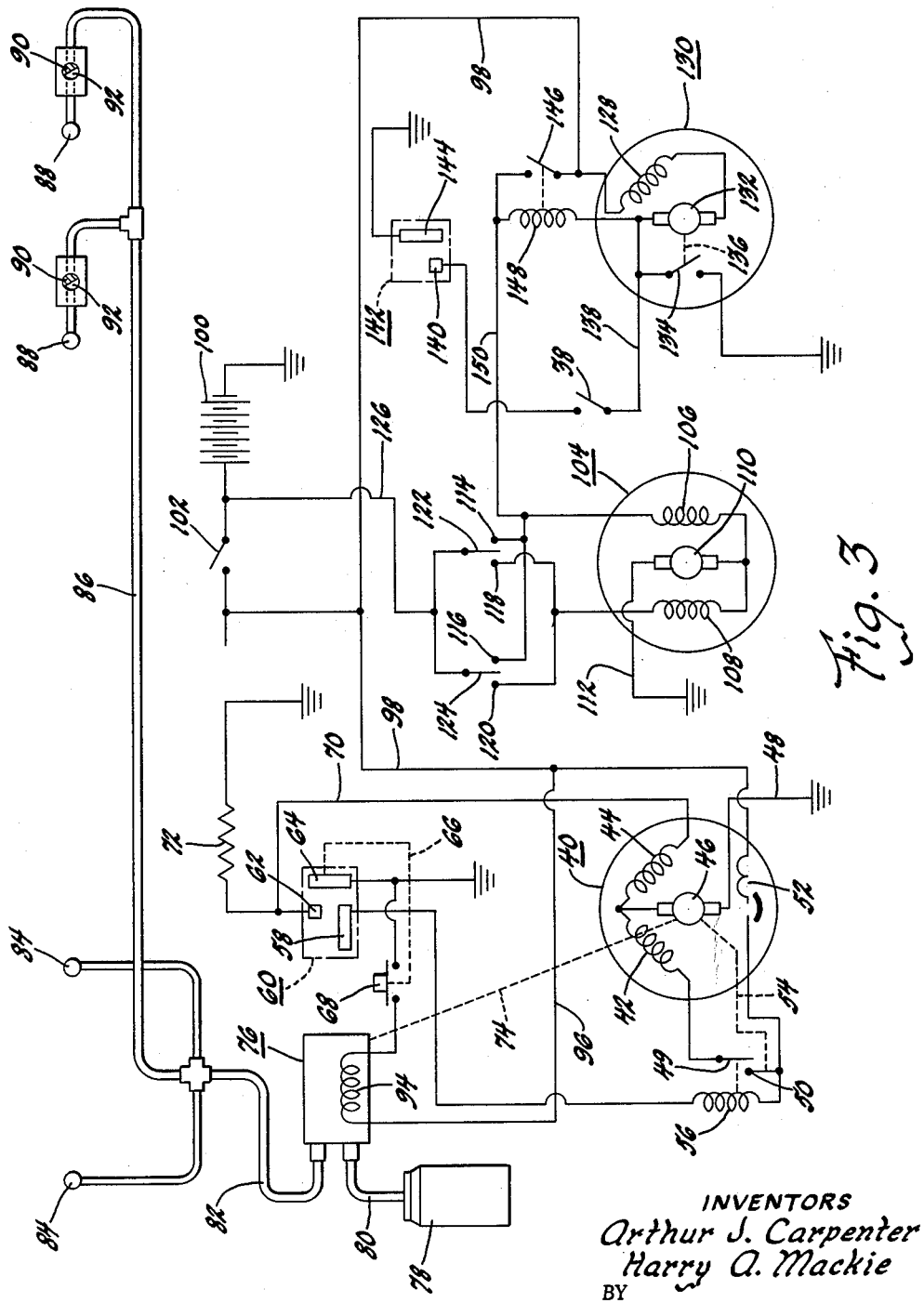
Figure 4:
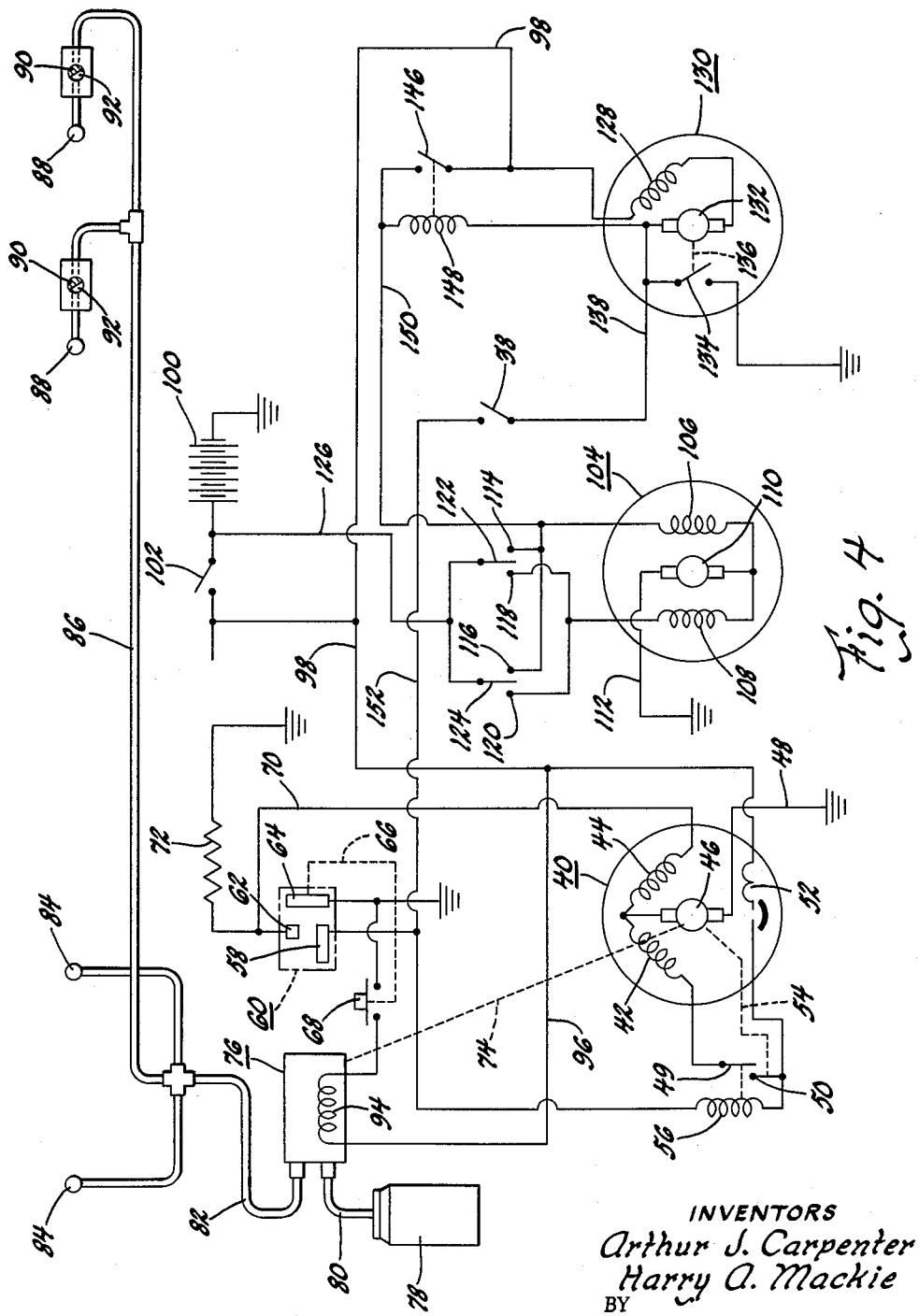

In the drawings:
FIGURE 1 is a fragmentary view, in elevation, with certain parts broken away, of a vehicle equipped with the rear window cleaning system of this invention.
FIGURE 2 is an enlarged fragmentary sectional view taken along line 2—2 of FIGURE 1.
FIGURE 3 is a combined fluid and electrical schematic of one embodiment of the front and read window cleaning systems.
FIGURE 4 is a combined fluid and electrical schematic of another embodiment of the front and rear window cleaning system.

Figure 5:
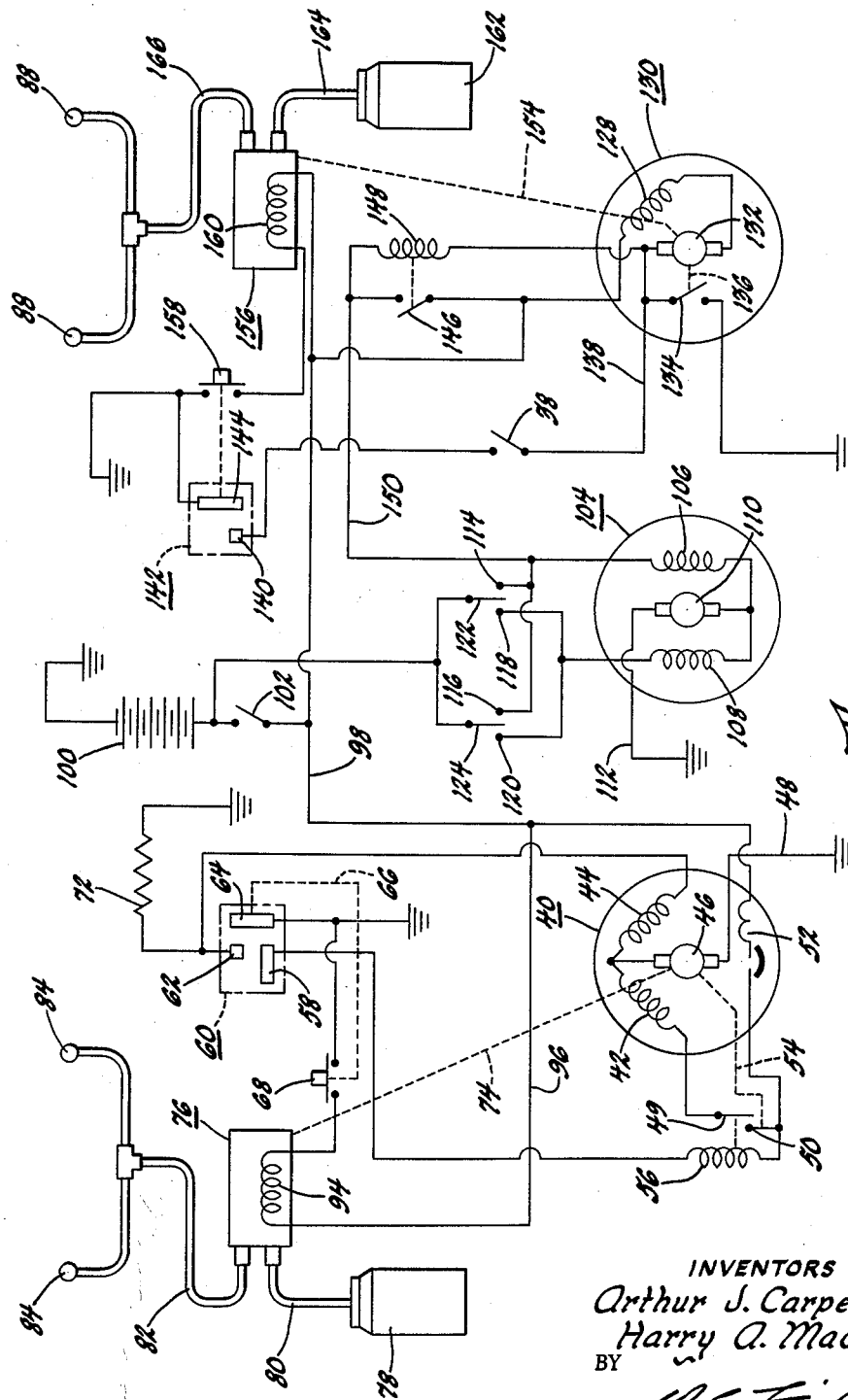

FIGURE 5 is a combined fluid and electrical schematic of a third embodiment of the front and rear window cleaning system.

With particular reference to FIGURES 1 and 2, the present invention is primarily directed to a cleaning system for the rear window of station wagon-type vehicles which include a tailgate 10 that is swingable about a horizontal axis on hinges 12, which tailgate supports a vertically movable rear window 14. As is customary the rear window 14 is supported by channel guides for upward and downward movement, the window being shown in the fully lowered position in FIGURE 1.

The cleaning system for the rear window 14 includes a wiper unit and a washer unit. The wiper unit comprises a suitable motor 16 mounted between the inner and outer channels of the tailgate 10 having a rotary output crank connected by a link 18 to a crank arm 20, the crank arm 20 being connected to a pivot shaft to which a spring biased wiper arm 22 is attached. The crank arm 20 is connected by a rod 24 to a crank arm 26 for a second wiper, the crank arm 26 being connected to a pivot shaft having a second spring biased wiper arm 22 attached thereto. The wiper arms 22 carry wiper blades 28. The arms 22 and the blades 28 are oscillatable in tandem, or in phase, across the outer surface of the rear window 14 during operation of the rear window wiper motor 16.

The blades 28 are shown in their parked positions in FIGURE 1, from which it can be seen that the blades are in a substantially horizontal position adjacent the upper reveal molding 30 of the tailgate 10. In this position the blades 28 are in engagement with the rear window glass 14 since the rear window 14 is in its fully lowered position, as determined by suitable stops within the channel guides, not shown. In order to prevent breakage of the rear window 14 which cannot be fully lowered into the tailgate 10, the present invention comprehends the use of a guard rail 32 mounted on the inside of the vehicle and supported by brackets 34.

As seen particularly in FIGURE 2, the guard rail 32 is attached to the inner garnish molding 36 and can be used as a tailgate lift handle. By providing this arrangement it is unnecessary to embody any recessed area below the tailgate window opening for accommodating the wiper blades 28 in their parked position. A micro switch 38 is actuated by the rear window 14 so as to be open when the tailgate window is lowered, and closed when the tailgate window is fully closed, or substantially fully closed. This micro switch 38, as described more particularly hereinafter, is connected in the energizing circuit for the rear wiper motor 16 so as to preclude operation of the rear wiper unit except when the rear window is substantially fully closed, since otherwise it would be possible to damage the wiper arms and blades.

With reference to FIGURE 3, one embodiment of the control system for the windshield and rear window cleaning systems will be described. As alluded to hereinbefore, the windshield cleaning system comprises a wiper unit and a washer unit, the washer unit including a pump having an interruptible driving connection with the wiper motor such as disclosed in the aforementioned Ziegler patent. Thus, the wiper unit for the windshield cleaner may comprise a two-speed electric motor 40 which is drivingly connected to a pair of oscillatable wiper blades movable across the outer surface of the vehicle windshield in a conventional manner. The two-speed motor 40 includes a series field 42, a shunt field 44 and an armature 46. One terminal of the armature is connected to ground by a wire 48. One end of the series field 42 is connected to the movable contact 49 of the parking switch which may be constructed in accordance with the Contant et al. Patent 2,985,024. The movable contact 49 is engageable with a second contact 50 which is connected to the power supply through thermal overload switch 52. The switch contact 50 is cam operated from the motor 40 through a linkage 54 when the wiper blades are in their depressed parked position. The contact 49 is moved into engagement with the contact 50 when the relay coil is energized, and remains in engagement therewith until the linkage 54 displaces the contact 50.

The relay 56 is connected with the stationary contact 58 of a wiper control switch 60. The wiper control switch 60 includes a second stationary contact 62 and a movable bridging contact 64 which may have a one-way driving connection 66 with a push button washer switch 68 is accordance with the teachings of Ziegler Patent 2,905,962. Alternatively, a switch arrangement such as shown in the Ziegler Patent 2,878,505 may be used to provide for delayed automatic wiper unit shutoff after cessation of washer unit operation. The switches 60 and 68, as disclosed, provide for automatic conjoint operation of the washer unit and the wiper unit, automatic cessation of the washer unit operation, and manual control of wiper unit operation.

The stationary contact 62 of the wiper switch 60 is connected by wire 70 to the shunt field winding 44 and also to a speed control resistor 72. The wiper motor 40 is shown having an interruptible mechanical connection 74 with a washer pump 76 constituting part of the washer unit. The washer unit includes a reservoir 78, containing liquid solvent, is connected by intake conduit 80 to the pump 76, which has an outlet conduit 82 connected to a pair of nozzles 84 for spraying liquid solvent onto the windshield of the vehicle into the paths of movement of the wiper blades. In this embodiment, the conduit 82 is connected to a second conduit 86 which communicates with nozzles 88 for spraying liquid solvent onto the rear window into the paths of movement of the rear window wiper blades 28. Likewise, in this embodiment the pivot shafts 90 of the rear wiper blades have cut away portions 92 constituting valves which block communication between nozzles 88 and the conduit 86 when the blades 28 are in their parked position. Structurally, the valves partake of the form shown in the aforementioned copending application S.N. 160,067.

The washer unit 76 also includes a control relay 94 which operates to establish the driving connection 74 between the wiper motor 40 and the washer pump 76. The relay 94 is connected in circuit with washer push button switch 68 and a wire 96 to a wire 98 which is connected to one terminal of the vehicle battery 100 through an ignition switch 102. Accordingly, it will be appreciated that the cleaning system for the windshield can only be energized when the ignition switch 102 is closed.

The rear window 14 may be operated by an electric motor driven actuator including a reversible electric motor 104 of the split series field type having a series field winding 106 and 108 in an armature 110. One terminal of the armature is connected to ground through wire 112 and the other terminal of the armature is connected to the common ends of windings 106 and 108. When the winding 106 is energized, the motor 104 rotates in a direction to lower the window 14, and when the winding 108 is energized the motor 104 rotates in the opposite direction to raise the window 14.

Winding 106 is connected to stationary switch contacts 114 and 116, while winding 108 is connected to stationary switch contacts 118 and 120. A movable switch contact 122 can be engaged with either contacts 114 or 118, and movable switch contact 124 is engageable with stationary contacts 116 and 120. The switch contact 122 may be mounted in the tailgate, while the switch 124 may be mounted on the instrument panel of the vehicle. Movable contacts 122 and 124 are connected by wire 126 directly to the battery 100 ahead of the ignition switch. Therefore, it will be appreciated that the tailgate window 14 can be raised or lowered with the ignition switch 102 in either the open or closed position.

Wire 98 is also connected to the shunt field winding 128 of a single speed wiper motor 130 for the rear window. The single speed motor 130 includes an armature 132, one terminal of which is connected to the end of the shunt field winding 128. The other terminal of the armature 132 is connected to ground through a parking switch 134 operated through a cam linkage 136 driven by the motor 130, the parking switch being of the cyclic type which is opened whenever the blades arrive at their inboard stroke end, or parked, position. The parking switch 134 is shunted by a wire 138 connected through the micro switch 38 to a stationary contact 140 of a rear window wiper manual control switch 142. The rear window control wiper switch 142 includes a movable contact 144 connected to ground. The shunt field winding 128 is also connected through a relay operated switch 146 controlled by a coil 148 which is connected between the armature 132 and a wire 150, the wire 150 being connected with the contacts 114 and 116 of the tailgate window actuator switch.

The control system shown in FIGURE 3 operates as follows. With the ignition switch 102 closed, the vehicle operator can initiate operation of the windshield cleaning system including a washer unit and the wiper unit, or only the wiper unit, and can also initiate operation of the rear window wiper unit independently of the windshield cleaning system or the windshield wiper unit. Thus, if the operator actuates the switch 60 by moving the bridging contact 64, the wiper motor 40 will be energized for either low or high speed operation. On the other hand, if the operator closes the washer switch 68, both the windshield wiper unit and the windshield washer unit will be energized, with the washer unit operating to discharge a predetermined volume of liquid solvent onto the windshield after which it is automatically arrested, and the wiper unit continues to operate until it is manually shut off. Similarly, if the tailgate window 14 is substantially fully closed, the micro switch 38 will be closed, and accordingly the rear window wiper unit can be energized by switch 142. Moreover, if the rear window wiper unit is energized, and the washer switch 68 for the windshield cleaning system is actuated the liquid solvent being discharged by the plunger 76 will be sprayed simultaneously onto the windshield through the nozzles 84 and the rear window through the nozzles 88.

However, if the rear window 14 is lowered to a position where switch 38 is open, the rear window wiper unit cannot be energized by closure of switch 142. On the other hand, if the rear window is fully closed, but the ignition switch 102 has been opened with the rear window wiper switch 142 closed, the motor 130 will be deenergized and the wiper blades 28 will immediately stop. If subsequently the rear window is lowered by moving either contact 122 into engagement with contact 114, or contact 124 into engagement with contact 116, the relay coil 148 will be energized to close switch 146 thereby resulting in energization of the wiper motor 130 to move the blades 28 to the parked position whereat the switch 134 will deenergize the motor 130. In this manner, the system automatically prevents lowering of the rear window with the wiper blades in any position other than the parked position.

With reference to FIGURE 4, in the second embodiment the control system comprehends the use of a single wiper control switch 60 for both the windshield cleaning system and the rear window cleaning system. The only difference is that the stationary contact 58 is connected by a wire 152 to the micro switch 38, all other components remaining the same. In this embodiment the rear window wiper unit will be energized conjointly with the windshield wiper unit, but only if the micro switch 38 is closed, and the rear window is substantially fully raised. Thus, in the second embodiment both forward and rearward vision will be automatically facilitated upon the manipulation of a single control switch. Likewise, both the windshield and the rear window can be cleaned through conjoint operation of the wiper units and the washer units upon manipulation of a single switch 68.

In the embodiment shown in FIGURE 5, the rear window wiper motor 130 has an interruptible driving connection 154 with a rear window washer pump 156, identical in construction with the windshield washer pump 76. In this embodiment the rear window cleaning system control embodies a push button switch 158 for energizing the control relay 160 of the rear window washer unit, and the rear window washer unit includes its own reservoir 162 connected by conduit 164 to the pump 156. The pump includes a delivery conduit 166 connected to the rear window nozzles 88, which in this instance do not include the pivot shaft valves since the rear window cleaning system can only be energized when the micro switch 38 is closed, and hence the rear window is substantially fully raised. In the third embodiment it will be apparent that the operator has independent controls for the windshield wiper and washer units, and the rear window washer and wiper units.

From the foregoing it is apparent that the present invention provides for adequate forward and rearward vision, with adequate safety features to prevent damage to the rear window wiper unit and also precluding the discharge of liquid solvent from the rear window washer unit into the interior of the vehicle if the rear window should be lowered. In addition, the present invention enables the coordinated operation of the windshield cleaning system with a rear wiper cleaning system upon manipulation of a single control element, thus reducing the hazard of inadequate vision when driving in inclement weather.

While the embodiments of the invention as herein disclosed constitute preferred forms, it is to be understood that other forms might be adopted.

What is claimed is as follows:

1. In a vehicle, a rear window capable of being raised and lowered, a windshield cleaning system including a windshield washer unit and a windshield wiper unit, a rear window cleaning system including a rear window wiper unit and a rear window washer unit, and coordinated control means operable to automatically initiate operation of the rear window cleaning system upon initiating operation of the windshield cleaning system when the rear window is substantially fully raised.

2. In a vehicle, a rear window capable of being raised and lowered, a windshield cleaning system including a windshield washer unit and a windshield wiper unit, a rear window cleaning system including a rear window wiper unit and a rear window washer unit, a manual control for initiating operation of the rear window wiper unit, and means automatically initiating operation of the rear window washer unit upon initiating operation of said windshield cleaning system when said rear window is substantially fully raised.

3. In a vehicle, a rear window capable of being raised and lowered, a windshield cleaning system including a windshield washer unit and a windshield wiper unit, a rear window cleaning system including a rear window wiper unit and a rear window washer unit, control means for initiating operation of the windshield cleaning system and the rear window cleaning system, and means operable to preclude operation of the rear window cleaning system when the rear window is in a lowered position.

4. In a vehicle, a rear window capable of being raised and lowered, a windshield cleaning system including a windshield washer unit and a windshield wiper unit, a rear window cleaning system including a rear window washer unit and a rear window wiper unit, said windshield washer unit and said rear window washer unit including a single pump, and means precluding operation of the rear window washer unit when said rear window is in a lowered position.

5. In a vehicle, a rear window capable of being raised and lowered, a windshield cleaning system including a windshield washer unit and a windshield wiper unit, a rear window cleaning system including a rear window washer unit and a rear window wiper unit, a separate pump for each of said washer units, and means precluding operation of the rear window washer unit when said rear window is in a lowered position.

6. In a vehicle, a rear window capable of being raised and lowered, a windshield cleaning system including a windshield washer unit and a windshield wiper unit, a rear window cleaning system including a rear window washer unit and a rear window wiper unit, control means for setting said windshield cleaning system and said rear window cleaning system in operation, and means precluding operation of said rear window cleaning system when said rear window is in a lowered position.

7. The combination set forth in claim 6 wherein said rear window cleaning system includes an electric motor, and wherein said last recited means comprises a switch connected in the energizing circuit for said electric motor, said switch being closed when said rear window is substantially fully raised, and open when said rear window is lowered.

8. The combination set forth in claim 6 wherein said windshield cleaning system includes a first electric motor for operating the windshield wiper unit, the windshield washer unit and the rear window washer unit, wherein said rear window cleaning system includes a second electric motor for operating the rear window wiper unit, and wherein said last recited means comprises a switch in the energizing circuit of said rear window wiper unit motor for precluding energization thereof when said rear window is in a lowered position.

9. In a vehicle, a rear window capable of being raised and lowered, a rear window cleaning system including a rear window washer unit and a rear window wiper unit, a manual control for initiating conjoint operation of the rear window wiper unit and the rear window washer unit, and means automatically precluding operation of said rear window cleaning system when said rear window is in a lowered position.

10. In a vehicle, a rear window capable of being raised and lowered, a rear window wiper unit, a manual control for initiating operation of said rear window wiper unit, and means automatically precluding energization of said rear window wiper unit when said rear window is in a lowered position.

11. In a vehicle, a rear window capable of being raised and lowered, a switch actuated by said window so as to be closed when the rear window is substantially fully raised and open when said window is lowered, a rear window wiper unit including an electric motor, a manual control for setting said rear window wiper unit in operation, said switch being connected in the energizing circuit of said electric motor so as to preclude energization thereof when the rear window is in a lowered position.

12. In a vehicle, a rear window capable of being raised and lowered, an electric motor driven actuator for raising and lowering said window, an energizing circuit for said window actuator including control switch means, a battery, the energizing circuit for the rear window actuator being connected directly to one terminal of said battery, a rear window wiper unit including an electric motor, an energizing circuit for said rear window wiper unit including a manual control switch connected in series with said battery through an ignition switch, said wiper unit including a parking switch operated by said motor and shunting said manual control switch, a relay connected in the energizing circuit for said window actuator when it is energized to lower said window, and a switch actuated by said relay for automatically completing the energizing circuit to said rear window wiper motor to automatically park said rear window wiper unit with the ignition switch open when the rear window is lowered.

13. In a vehicle, a rear window capable of being raised and lowered, an electric motor driven actuator for raising and lowering said window, a rear window wiper unit including an electric motor, and an energizing circuit for said rear window wiper motor to automatically park said rear window wiper unit when the rear window is lowered.

14. In a vehicle, a hinged tailgate, a rear window capable of being raised and lowered and carried by said tailgate, a guard rail attached to the interior of said tailgate and extending thereabove, a portion of said rear window extending above said tailgate but beneath said guard rail when it is in its fully lowered position, and a rear window wiper unit carried by said tailgate including a wiper arm and a wiper blade, said wiper blade having a parked position in which it is substantially horizontally disposed adjacent the upper reveal molding of said tailgate and in engagement with said rear window.

15. The combination set forth in claim 14 wherein said guard rail constituted a tailgate lift handle and extends transversely thereacross.

16. In a vehicle having a tailgate swingable about a horizontal axis between substantially vertical and horizontal positions and having a window capable of being raised and lowered when the tailgate is in said substantially vertical position, means for raising and lowering said window, a wiper unit for said window comprising a wiper motor mounted in said tailgate, a pivot shaft supported in said tailgate, drive means interconnecting said motor and said pivot shaft for imparting oscillation thereto and a wiper blade and arm assembly attached to said pivot shaft for oscillation across the outer surface of said window between predetermined stroke end positions, a manual control for said wiper motor, and auxiliary control means for said wiper motor actuated by said window for automatically de-activating said wiper motor to arrest movement of said wiper blade and arm assembly at one of its stroke end positions when the window is lowered.

17. In a vehicle having a tailgate swingable about a horizontal axis between substantially vertical and horizontal positions and having a window capable of being raised and lowered when the tailgate is in said substantially vertical position, means for raising and lowering said window, a wiper unit for said window, a washer unit for said window, manual control means for initiating operation of said wiper unit and said washer unit, and automatic control means for arresting operation of said wiper unit and said washer unit when the window is lowered.

18. In a vehicle having a tailgate swingable about a horizontal axis between substantially vertical and horizontal positions and having a window capable of being raised and lowered when the tailgate is in said substantially vertical position, means for raising and lowering said window, a wiper unit for said window, a washer unit for said window, manual control means to initiate conjoint operation of said wiper unit and said washer unit, an automatic control means to arrest the conjoint operation of said wiper unit and said washer unit when the window is lowered.

19. In a vehicle having a tailgate swingable about a horizontal aixs between substantially vertical and horizontal positions and having a window capable of being raised and lowered when the tailgate is in said substantially vertical position, means for raising and lowering said window, a wiper unit for said window comprising an electric motor and a blade and arm assembly oscillatable by said electric motor between predetermined stroke end positions, an energizing circuit for said electric motor including a manual control switch for completing the energizing circuit to said motor and a motor operated parking switch for interrupting the energizing circuit for said motor so as to arrest movement of said blade and arm assembly at one of said stroke end positions, and auxiliary switch means connected in series with said manual control switch for automatically interrupting said energizing circuit when the window is lowered.

20. In a vehicle having a tailgate swingable about a horizontal axis between substantially vertical and horizontal positions and having a window capable of being raised and lowered when the tailgate is in said substantially vertical position, means for raising and lowering said window, a wiper unit for said window, a washer unit for said window, a single motor for actuating said wiper unit and said washer unit, said washer unit having an interruptible driving connection with said motor, a manual control for energizing said motor and establishing the driving connection between said motor and said washer unit to effect conjoint operation of said wiper unit and said washer unit, and automatic control means for arresting operation of said motor when the window is lowered.

References Cited in the file of this patent

UNITED STATES PATENTS 2,693,612     Zeigler et al. _____ Nov. 9, 1954